Patented Oct. 21, 1930

1,779,226

UNITED STATES PATENT OFFICE

LINN BRADLEY, OF MONTCLAIR, NEW JERSEY, AND EDWARD P. McKEEFE, OF PLATTSBURG, NEW YORK, ASSIGNORS TO BRADLEY-McKEEFE CORPORATION, OF NEW YORK, N. Y., A CORPORATION OF NEW YORK

TREATMENT OF BLACK LIQUOR

No Drawing. Application filed January 3, 1921, Serial No. 434,720. Renewed July 5, 1928.

This invention relates to the treatment of the residual liquors from the soda pulp process, as they come from the digesters, and commonly known as black liquor, for the recovery therefrom of valuable products.

In the soda pulp process, the chipped wood is subjected to digestion with caustic soda liquor of a strength of about 10.5 to 11.5 Bé., and containing about 92% of the soda as caustic soda (the remainder being mostly sodium carbonate). Usually about 900 gallons of the caustic soda solution are used per cord of wood (measured before chipping), and the digester is heated by direct steam at a pressure which varies from about 90 to 140 pounds, and for a suitable period of time, for example, from 3 to 5 hours. The liquor usually is circulated within the digester by the steam during the digestion or cooking. The strength of the liquor and the time of treatment will vary somewhat according to the kind, quality and condition of the wood treated. The caustic soda solution used in the cooking operation is commonly made from soda ash by causticizing a solution thereof with lime. The digester is "blown" at the end of the cook and the pulp is separated from the black liquor and is washed with water. The black liquor separated from the pulp is commonly mixed with a certain amount of the wash water and the mixture constitutes what is commonly referred to as black liquor.

During the digestion in the soda pulp process a very considerable amount of wood is dissolved so that the black liquor contains a considerable amount of organic matter in solution, as well as other products produced during the digestion, and various sodium compounds. The black liquor thus commonly carries about 11 to 11½ grams of solids per 100 cc., and the total soda in the liquor is equal to about 5.75 percent of sodium carbonate, this determination being made by permitting 100 cc. of the liquor to dry and igniting the residue, burning off the organic matter and leaving the sodium carbonate behind.

The common method of treating the black liquor has been to evaporate a part of the water in evaporators and then feed the concentrated black liquor into an incinerator, the common type being a rotary furnace. The black liquor is further concentrated in the rotary furnace and finally burned, the organic matter being decomposed, and the inorganic matter being concentrated in the black ash, particularly in the form of sodium carbonate. The black ash is then treated with water to dissolve the sodium compounds away from the insoluble residue of carbon, etc., and the resulting solution, after suitable clarification, and after the addition of a further amount of soda ash, to make up for losses which are usual in the present process (amounting to as much as 15%), is causticized with lime. The soda is thus converted, so far as is practicable, into sodium hydroxide or caustic soda. The lime mud is allowed to settle and the clarified solution of caustic soda, together with wash water, is drawn off to be used again in the digester. The lime mud is wasted, after washing, together with a small percentage of sodium compounds. The organic constituents of the black liquor are consumed or carbonized in the rotary furnace. The only constituents of the black liquor which are commonly recovered are the sodium compounds (principally as sodium carbonate), the organic constituents of the liquor being lost, together with a small part of the sodium compounds.

The presence of acetates, etc., in the black liquor has been reported, but so far as we have been able to ascertain no practical method for their recovery has been proposed.

According to the present invention, valuable constituents, other than the soda, are recovered, while the soda is itself recovered for reuse in the pulp mill in a simple and advantageous manner.

The black liquors which are treated, according to the present invention, are such as are produced in the soda pulp process above described, although other black liquors of similar composition and properties can also be treated. These black liquors generally contain some uncombined sodium hydroxide, together with sodium carbonate and compounds of sodium and organic materials, and also some fermentable sugars.

In treating the black liquor, according to the present invention, we add thereto preferably while still hot from the digester, a reagent or reagents capable of combining with the free sodium hydroxide and with certain of the sodium organic compounds, so that a large part of the sodium organic compounds are decomposed and organic matter precipitated from solution, and so that the soda is practically all recombined with the reagent to form sodium salts which remain in solution. The reagents used may be acids or acid sodium salts, or ammonium salts, the acid radical of which will combine with the sodium to form sodium salts causticizable with lime. The reagent may thus be an acid such as phosphoric acid, sulfurous acid (sulfur dioxide), hydrofluoric acid, oxalic acid, carbonic acid (carbon dioxide); or the acid radical may be introduced in the form of an acid sodium salt, such as sodium bicarbonate, sodium bifluoride, monosodium or disodium phosphate, sodium bisulfite, etc.; or an ammonium salt may be used, the acid radical of which will combine with the sodium to form a causticizible sodium salt, while the ammonia will be set free and can be volatilized and recovered. Among such ammonium compounds may be mentioned ammonium phosphates, ammonium fluoride, ammonium sulfite, ammonium oxalate, ammonium carbonate or bicarbonate, etc. These reagents are used in sufficient amount to combine with the free sodium hydroxide and to decompose a large portion of the sodium organic compounds with resulting precipitation of most of the precipitable organic matter from solution. The sodium of the caustic soda and of the decomposed organic compounds will be converted into salts (which remain in solution) causticizible with lime, that is, salts containing an acid radical which combines with calcum to form normal calcum salts which are less soluble than calcium hydroxide, e. g., tricalcium phosphate, dicalcium phosphate, calcium sulfite, calcium fluoride, calcium oxalate, etc.

As a result of the treatment of the black liquor with such a compound, the free caustic soda is converted into causticizible sodium salts, and the sodium combined with organic matter is also largely converted into such sodium salts, while the precipitable organic matter is to a very large extent precipitated from solution in an insoluble form. The organic matter thus separated from the solution is removed by sedimentation, filtration, screening or other suitable means and forms one of the valuable products of the process.

After the recovery of the precipitated organic matter from the black liquor, the liquor will contain practically all of the soda in the form of soluble sodium salts. Any excess acidity, in case an excess of acid or acid salt has been added, may or may not be neutralized and the liquor then concentrated.

Owing to the removal of much of the organic matter from the black liquor, this liquor can be more readily evaporated without objectionable foaming and the evaporation can be carried to a much further degree than the black liquor which is commonly evaporated and which contains all of its organic matter. The evaporation of the solution can thus be carried to such a degree as will correspond to the strength of the solution used originally in the digester; or the solution can be still further concentrated to give a more concentrated caustic solution. A further small amount of soda can then be added to the concentrated liquor, if necessary, for example, in the form of soda ash or other causticizable sodium salt to make up for losses, and the solution can then be causticized by treatment with lime; or caustic soda can be added to the liquor, after it has been causticized, to make up for losses.

The causticizing treatment results in the conversion of the lime into the form of a less soluble calcium salt or salts which can be separated, washed and recovered by filtration or otherwise, and the causticized liquor can then be returned to the digester for use in the treatment of further amounts of wood chips, or the caustic liquor can be otherwise utilized in whole or in part.

Instead of first concentrating the black liquor after the removal of organic matter, and then causticizing the concentrated black liquor with lime, we may first causticize the black liquor, after the removal of the organic matter therefrom and before concentration, although we regard the causticizing after concentration as more advantageous, and as ordinarily to be recommended.

The process will vary somewhat with the particular reagent used for treating the black liquor and precipitating the precipitable organic matter. If carbon dioxide is used for the treatment of the black liquor, it will combine with the free caustic soda and with most of the sodium combined with the organic matter, setting free most of the precipitable organic matter and converting the sodium into sodium carbonate in solution. The sodium carbonate already present in the black liquor will, in this case, remain unchanged, if an excess of carbon dioxide such as would form the bicarbonate is avoided.

After the precipitable organic matter has been thus precipitated and filtered off or otherwise removed, the resulting black liquor, (with which the wash water from washing the precipitated organic matter may be admixed), is causticized with lime and then concentrated, or first concentrated and then causticized with lime, and brought to a suitable degree of concentration, for example, such that the concentrated causticized liquor can be returned to the digester for reuse. The concentration can thus be regulated and stopped, for example, when a liquor of the proper concentration for reuse has been obtained; or the liquor can be still further concentrated, and mixed with the more dilute wash water from the washing of the precipitated organic matter, and a composite solution thus obtained of proper strength for reuse in the digester. Any losses of soda can be made up by a further addition to the liquor before causticizing of soda ash or other causticizible sodium compound, or by the addition of caustic soda to the causticized liquor. The wash water after the causticizing step may be added to the liquor before concentrating.

In case sulfur dioxide is used for the treatment of the black liquor, it will form sodium sulfite with the free caustic soda, and with the sodium combined with the precipitable organic matter, and it will also react with the sodium carbonate to form sodium sulfite if a sufficient amount of sulfur dioxide is used. Some sodium bisulfite may also be formed although an excess of sulfur dioxide should not ordinarily be used beyond that which will neutralize the caustic soda and sodium carbonate and precipitate the precipitable organic matter and combine with an equivalent amount of the soda of the black liquor. After the treatment with the sulfur dioxide, the organic matter will be precipitated and can be filtered out or otherwise removed, leaving the solution containing the sodium sulfite together with some bisulfite and some oxalate, acetate, etc. The solution can be causticized and concentrated, or concentrated and causticized, with removal of the sulfurous acid in the form of insoluble calcium sulfite, and production of a solution of caustic soda. The concentrated and causticized solution together with wash water can be brought to a strength appropriate for further use in the digester and then returned to the digester together with added caustic soda if necessary, or with added sodium carbonate or sodium sulfite before causticization. If insufficient lime is used for causticizing all the sodium sulfite in the liquor, the resulting solution will contain a mixture of caustic soda and sodium sulfite, which can be used in the digester, thus securing the combined advantages of these reagents.

Instead of using sulfur dioxide, sodium bisulfite may be similarly used, or the neutralization or acidification can be effected in part by sulfur dioxide and in part by sodium bisulfite. For example, sufficient sodium bisulfite may be added to make up for losses of soda in the process, or even in excess of this amount, so that, upon causticization and concentration, an amount of caustic soda will be produced equal to or in excess of that originally used. The necessity for adding soda in the form of soda ash before causticizing, or of caustic soda after causticizing, is thus avoided.

If hydrofluoric acid or sodium bifluoride or a mixture of both is used for the treatment of the black liquor and the precipitation of organic matter, the subsequent causticizing with lime, either before or after concentration, will result in the production of insoluble calcium fluoride. To the extent that sodium bifluoride is used, it will supply added soda which will be causticized and which will make up in part or in whole for any losses, or may even provide an excess for other uses.

If phosphoric acid or sodium acid phosphate is used for the precipitation of organic matter, the subsequent causticizing with lime will produce insoluble tricalcium phosphate or dicalcium phosphate or a mixture of both, which can be removed from the causticized liquor. If sodium acid phosphate or disodium phosphate is used for the neutralization or acidification, and if the liquor is causticized while it still contains all of the sodium phosphate produced by the neutralization or acidification, this sodium phosphate will be causticized by lime and will form a corresponding amount of caustic soda, while the lime will be precipitated as insoluble tricalcium phosphate or dicalcium phosphate or both. The amount of added soda, added in the form of disodium phosphate sodium acid phosphate, may be so regulated, or the amount of sodium phosphate left in the liquor to be causticized (in case part of the excess sodium phosphate is separated by crystallization from the concentrated liquor) can be so regulated that sufficient added soda will be present to make up for losses, so that the amount of caustic liquor available for returning to the digester will correspond to that originally used.

When ammonium salts are used for the treatment of the black liquor and the precipitation of precipitable organic matter, the ammonia will be set free and can be volatilized away from the solution in a free state while the acid radical of the ammonium salt will combine with the sodium to form sodium salts in solution. The ammonium salts thus act in a manner similar to the action of acids or acid sodium salts, but with the difference that the ammonia of the ammonium salts is set free and recovered by volatilization. The sodium of the black liquor will combine in a similar manner to form causticizable sodium salts in solution, and the precipitable organic matter will be precipitated in a similar way.

The black liquor contains a considerable amount of sodium acetate. We have found that the amount of sodium acetate is such that it can be profitably and advantageously recovered without interfering with the subsequent reuse of the causticized liquor for carrying out further digestion of the wood chips. We have found that if the causticized liquor is sufficiently concentrated, the sodium acetate will, to a considerable extent, crystallize out from the liquor on cooling, and can thus be recovered in a crystalline state. Such amounts of sodium acetate as are not crystallized out will remain in the liquor and will be returned to the digester. So also, if the concentration of the caustic liquor is not carried sufficiently far to cause separation of the sodium acetate, it will remain in the causticized liquor and will be returned to the digester.

When the black liquor is treated with carbon dioxide or sodium bicarbonate or ammonium carbonate or bi-carbonate for precipitation of organic matter, and the resulting solution is causticized and then concentrated, the concentration can be carried to such an extent that part of the sodium acetate will be precipitated out on cooling. It is not necessary to take out all of the sodium acetate, or more than sufficient to prevent it from building up to an objectionable extent in the solution. That is, only the excess of sodium acetate need be removed, or somewhat more than the excess, although the liquor may be treated for the removal of as much as possible of the sodium acetate.

If the sodium acetate is not produced in sufficient amount during one digestion to make it profitable to recover it from the black liquor, it can be returned with the concentrated and causticized liquor to the digester and permitted to build up in this way, by returning the liquor one or more times, until there is enough sodium acetate in the black liquor produced by the subsequent operation to make it profitable to separate it, or to separate out the excess of the sodium acetate. That is, the sodium acetate can be permitted to remain in the liquor returned to the digester, and the liquor treated for the recovery of sodium acetate only after an accumulation thereof has taken place during two or more digestion operations. The black liquor can thus be freed from organic matter and concentrated and causticized and returned to the digester, and the liquor from the operation in which such return liquor is used can be treated for the separation of sodium acetate or can be again returned to the digester and the liquor produced from a subsequent operation treated for this purpose, depending upon the amount of sodium acetate which the original liquor and the successive liquors contain. Insofar as the sodium acetate undergoes change in the digester, for example, to sodium oxalate or other causticizable soda compound, the treatment of the black liquor with lime will reconvert such compounds into caustic soda which is thus made available in the further carrying out of the soda pulp process.

When sulfur dioxide or sodium bisulfite is used for treating the black liquor and precipitating organic matter, the resulting liquor can be causticized and concentrated and the concentration carried to such an extent that the sodium acetate will separate out on cooling, after which the concentrated caustic solution can be returned to the digester, with dilution if necessary so that it will have the appropriate strength. The sodium acetate may be removed after two or more digestions.

If phosphoric acid or disodium phosphate or monosodium phosphate is used for the treatment of the black liquor, the sodium acetate can be similarly recovered after the separation of the organic matter and after causticizing and concentrating the resulting liquor. If hydrofluoric acid or sodium bifluoride is used for treating the black liquor, the sodium acetate can be obtained in a similar manner. In the case of these various reagents, the same as in the case of the use of carbon dioxide for precipitating the organic matter, the causticized and concentrated solution can be returned to the digester without separating sodium acetate, and the sodium acetate can be separated from the black liquor subsequently produced in a successive operation.

Instead of removing the acetic acid from the black liquor in the form of sodium acetate, we may remove it in a free state by acidifying the black liquor with a suitable acid or acid compound (either at the time of precipitating organic matter or after organic matter has been separated, and either before or after concentration of the liquor from which organic matter has been separated) and distilling off the acetic acid and other volatile acids. These may be recovered by condensation. The liquor from which the precipitated organic matter and volatile acids have been removed, can then be causticized with lime and the caustic soda thus made available in solution, after further concentration if necessary, for reuse in the digester. The black liquor itself can thus be acidified to precipitate the precipitable organic matter and a sufficient excess of the acid or acid salt added to set free the acetic acid, etc., and the acetic acid and other volatile organic acids can be distilled off during the concentration of the black liquor and may be recovered with most of the condensate,—in this case being diluted with a considerable amount of water. The acetic acid, etc. can be obtained in a more concentrated state by first concentrating the liquor, after the precipitation and removal of organic matter, and then acidifying the concentrated liquor and distilling off the acetic acid, etc. These two methods of removing the acetic acid, etc., can be combined, and some of the acetic acid and other volatile acids distilled off during concentration, and the rest after concentration and after further acidification; but the distillation of acetic acid during concentration can be prevented by avoiding excess acid, or by neutralizing any excess acid, before concentration, so that the concentrated liquor will contain substantially all of the acetic acid, etc. in a combined state, and so that these acids can then be recovered in a more concentrated form by acidification and distillation of the concentrated liquor.

The acid or acid compound used for the acidification of the liquor, where the acetic acid is to be set free and distilled off, should be such an acid or acid compound as these above referred to which will form an insoluble calcium compound sufficiently less soluble than calcium hydroxide, in order to permit the causticizing of the sodium salts thereof with lime. Calcium phosphate, calcium fluoride, calcium oxalate, calcium sulfite and calcium carbonate are compounds which can thus be produced from the corresponding sodium salts by causticizing with lime; but sulfur dioxide and carbon dioxide are not suitable for removing acetic acid.

The wood commonly treated by the soda pulp process is poplar; and it is one advantage of the present invention that it enables larger amounts of bass wood and other woods of the same type to be utilized than have heretofore been utilizable to advantage, owing to the excessive soda losses occurring when these woods are used and difficulties due to foaming of the black liquor during concentration in the evaporators and incinerators. This objectionable foaming and excessive soda loss is largely overcome by the present invention when we remove the precipitable organic matter from the black liquor before concentration. The present invention, therefore, makes possible the treatment of cellulose-bearing materials which could not be treated economically, or which could be treated only with less advantage, according to the common methods of treatment.

The organic matter which is precipitated and removed from the black liquor is itself one of the valuable products of the process. It can be washed to remove admixed or adhering sodium salts, and the wash water mixed with the liquor from which the organic matter has been precipitated, and the mixture treated as hereinbefore described. The organic matter can be dried and used for various purposes, or it can be subjected to destructive distillation, giving valuable gaseous and liquid products, and a residue of high grade wood charcoal, practically ash-free.

The concentration of the liquor after the precipitation of most of the precipitable organic matter therefrom may bring about a further precipitation or separation of organic matter in a form which can be removed by filtration or otherwise before the concentrated liquor is causticized or before the causticized liquor is returned for reuse in the digester. In order to improve the color of the liquor before it is reused in the digester or before the sodium acetate is crystallized out therefrom, it can be subjected to a decolorizing chemical operation, or filtration (for example, by filtration through charcoal), and, for this purpose, the charcoal produced by calcination or destructive distillation of the organic matter precipitated from the black liquor can be used to advantage. When the sodium acetate is crystallized out from an alkaline solution, the alkali will tend to keep any remaining organic matter in solution so that contamination of the sodium acetate will be minimized. The crystallization of the sodium acetate from an alkaline solution is thus of advantage; while the solution, if discolored, can be improved in color before the crystallization, in the manner above indicated.

The content of fermentable sugar of the black liquor can be made use of as a source of alcohol, for example, by fermenting the liquor after the precipitation of organic matter therefrom, or after the liquor has been further concentrated. Any objectionable acidity of the liquor should be neutralized before fermentation.

It will thus be seen that the present invention involves a simple and advantageous method of treating black liquor, for the recovery of various valuable products therefrom, in which the black liquor is treated for the neutralizing of the free caustic soda and the precipitation of precipitable organic matter, and in which the black liquor freed from precipitable organic matter is concentrated and then causticized, or causticized and then concentrated, (either alone or after admixture with wash water from the washing of the precipitated organic matter), to give a caustic liquor which can be directly returned to the digester, with the addition of sufficient added caustic thereto, or of sufficient added causticizable soda compounds before causticizing, to make up for losses, or with the use of acid sodium salts in whole or in part for the initial treatment of the black liquor which will furnish the necessary added causticizible sodium compounds.

It will also be seen that the invention enables valuable organic compounds, such as acetic acid, formic acid, etc., to be obtained either in the free state by acidification and distillation of the liquor, or in the form of sodium acetate by sufficiently concentrating and cooling the neutralized and causticized liquor. The complete loss of sodium acetate which takes place in the common treatment of the black liquor in the rotary furnaces to form black ash is thus avoided, as well as the losses and expense incident to the production and leaching of the black ash before causticizing; and the concentrated black liquor which has been preliminarily freed from organic matter is directly causticized, either before or after concentration, so that the concentrated causticized liquor is ready for use directly for further digestion, or for other useful purposes.

It is a further advantage of the invention, when acid sodium salts are used for the treatment of the black liquor, that the black liquor will contain sufficient combined soda, or even an excess, so that, when the liquor is subsequently causticized, there will be enough caustic soda produced to make up for any losses in the process. The amount of the acid sodium salt used may thus be regulated in amount to make up for such losses, and the black liquor, after separating organic matter, will require merely to be concentrated and causticized or causticized and concentrated to obtain a caustic liquor for reuse in the soda pulp process. When an acid sodium salt is not used for the treatment of the black liquor, the necessary additional soda corresponding to that which is lost in the process, including that present in the form of noncausticizible salts, can be supplied by adding sufficient caustic soda from another source to the causticized liquor or by adding soda ash or other causticizible sodium salt to the liquor before it is causticized, so that the resulting liquor will be suitable for use as a cooking liquor for the digester.

In referring to the acidification or neutralization or treatment of the black liquor, for the precipitation of precipitable organic matter therefrom, we include, within the more comprehensive aspects of the invention, the use of reagents, such as acids, acid sodium salts, ammonium salts, etc., which will precipitate the precipitable organic matter and form causticizible sodium salts with the reactive sodium compounds (i. e. caustic soda, sodium organic compounds, etc.) of the black liquor. The reagent as above pointed out, may be an acid, an acid sodium salt, or an ammonium salt, or a mixture of two or more of these. We thus include, within the more comprehensive aspects of the invention, the treatment of the black liquor with carbon dioxide or sulfur dioxide, both of which act as acids or as an acid radical to precipitate organic matter and form causticizible sodium salts; as well as the treatment of the black liquor with acid sodium salts which supply an added amount of causticizible soda to the liquor, and also the treatment of the liquor with ammonium salts with setting free and recovery of ammonia by distillation and concentration or absorption. The process may thus produce an increased amount of caustic soda, where acid sodium salts are used; or it may produce ammonia as a valuable by-product, by using ammonium salts for the treatment of the black liquor.

While we have described the invention in connection with the treatment of black liquor from the soda pulp process, with particular reference to the process in which caustic soda is employed for the treatment of poplar and other woods, yet the invention is also applicable to the treatment of black liquor produced by the sodium sulfate process, so-called, especially as such liquor also commonly contains notable amounts of soda in the form of caustic soda, sodium organic compounds, causticizible sodium salts, etc., and inasmuch as part of the organic matter can be similarly precipitated from such black liquor in a similar manner to that hereinbefore described. Such sodium salts or compounds as are not causticizible, and as are not crystallized out or precipitated from the liquor due to concentration, will remain with the liquor and be returned to the digester. The causticized liquor, in this case, can be increased in soda content, to make up for losses, etc., by adding a causticizible sodium salt before causticizing, or by adding caustic soda after causticizing. So also, the black liquor produced when a mixture of caustic soda and sodium sulfite is used in the digester can be similarly treated; and, by incomplete causticizing with lime of the liquor from which precipitable organic matter has been separated, and concentration of the liquor before or after causticizing, a liquor can be produced containing a mixture of caustic soda and sodium sulfite suitable for reuse, having certain special advantage.

While, ordinarily, we believe it more advantageous to precipitate the precipitable organic matter from the black liquor before concentration, we may, nevertheless, subject the black liquor to a preliminary concentration before or during the precipitation of organic matter, so that the organic matter will be precipitated from a more concentrated liquor, and so that a more concentrated solution of causticizible sodium salts will be directly produced. The process, when such preliminary concentration is effected, will otherwise be similar to the process carried out without such preliminary concentration, although the necessary subsequent amount of further concentration will be correspondingly reduced, and a lesser amount of a more concentrated liquor will be handled during the precipitation of organic matter, etc.

In referring, in the appended claims, to the steps of concentrating and causticizing the black liquor, after the precipitation and removal of organic matter therefrom, we intend to include these steps whether the concentration precedes or follows the causticizing step, except where the sequence of the steps is definitely indicated.

We claim:—

1. The method of treating residual liquor from a pulp-making process in which caustic soda is employed in the cooking liquor which comprises sulfiting the liquor with acid sodium sulfite to form sodium sulfite therein and incompletely causticizing the sulfited liquor, thereby giving a solution containing both caustic soda and sodium sulfite.

2. The method of treating residual liquor from a pulp-making process in which caustic soda and sodium sulfite are employed in the cooking liquor which comprises sulfiting the liquor with acid sodium sulfite to form sodium sulfite therein and incompletely causticizing the sulfited liquor, thereby giving a solution containing both caustic soda and sodium sulfite.

3. The method of treating black liquor, which comprises adding thereto a sodium acid salt causticizible with lime, in amount sufficient to precipitate most of the precipitable organic matter from the liquor, and subjecting the resulting liquor to the steps of concentration and causticizing to give a concentrated and causticized liquor of increased caustic content due to the added sodium salt.

4. The method of treating black liquor, which comprises adding to such liquor a reagent, the acid radical of which forms with sodium a salt causticizable with lime, in amount sufficient to precipitate most of the precipitable organic matter from the liquor, separating the precipitated organic matter, subjecting the resulting liquor to concentration and continuing the concentration until sodium acetate separates therefrom, and recovering the sodium acetate.

5. The method of treating black liquor, which comprises adding to such liquor a compound containing an acid radical, the acid radical of which forms with sodium a salt causticizible with lime, in amount sufficient to precipitate most of the precipitable organic matter from the liquor and to set free part or all of the acetic and other volatile organic acids, and subjecting the reculting liquor to concentration and distillation to separate volatile organic acids and leave a concentrated liquor.

6. The method of treating black liquor, which comprises adding to such liquor a reagent, the acid radical of which forms with sodium a salt causticizible with lime, in amount sufficient to precipitate most of the precipitable organic matter from the liquor, separating the precipitated organic matter, subjecting the resulting liquor to the steps of concentrating and causticization, returning the concentrated and causticized liquor to the digester for further use, and after the black liquor has been thus treated and returned one or more times, treating the resulting black liquor for the separation of precipitable organic matter therefrom, and removing a compound containing an acetate radical therefrom.

7. The method of treating black liquor, which comprises adding to such liquor an acid sodium compound causticizable with lime, in amount sufficient to precipitate most of the precipitable organic matter from the liquor, separating the precipitated organic matter, and subjecting the resulting liquor to the steps of causticizing with lime and to concentration to produce a concentrated and causticized l'quor for use in the further carrying out of the soda pulp process, the amount of acid sodium compound added to the black liquor being sufficient to bring up the cooking liquor to the required strength.

8. The method of treating black liquor which comprises removing precipitable organic matter therefrom by means of an acid compound having an acid radical capable of forming causticizible sodium salts, volatilizing volatile organic acids from the solution, and treating the resulting liquor with an alkaline earth metal hydroxide.

9. The method of treating black liquor which comprises removing precipitable organic matter therefrom by means of an acid alkali metal salt having an acid radical capable of forming causticizible sodium salts, volatilizing volatile organic acids from the solution, and causticizing the resulting liquor.

10. The method of treating black liquor which comprises removing precipitable organic matter therefrom by means of an acid sodium salt having an acid radical capable of forming causticizible sodium salts, volatilizing volatile organic acids from the solution, and causticizing the resulting liquor.

11. The method of treating black liquor which comprises removing precipitable organic matter therefrom by means of an acid compound having an acid radical capable of forming causticizible sodium salts, and causticizing the resulting liquor, concentrating the resulting caustic solution, returning the concentrated an causticized liquor to the digester for further use, and after the black liquor has been thus treated and returned one or more times, treating the resulting black liquor for the separation, of precipitable organic matter therefrom and removing a compound containing the acetate radical.

12. The method of treating black liquor which comprises removing precipitable organic matter therefrom by means of an acid alkali metal salt having an acid radical capable of forming causticizible sodium salts, and causticizing the resulting liquor, concentrating the resulting caustic solution, returning the concentrated and causticized liquor to the digester for further use, and after the black liquor has been thus treated and returned one or more times, treating the resulting black liquor for the separation of precipitable organic matter therefrom and removing a compound containing the acetate radical.

13. The method of treating black liquor which comprises removing precipitable organic matter therefrom by means of an acid sodium salt having an acid radical capable of forming causticizable sodium salts, and causticizing the resulting liquor, concentrating the resulting caustic solution, returning the concentrated and causticized liquor to the digester for further use, and after the black liquor has been thus treated and returned one or more times, treating the resulting black liquor for the separation of precipitable organic matter therefrom and removing a compound contraining the acetate radical.

14. The method of treating black liquor which comprises removing precipitable organic matter therefrom by means of an acid compound having an acid radical capable of forming causticizable sodium salts, and causticizing the resulting liquor, concentrating the resulting caustic solution, returning the concentrated and causticized liquor to the digester for further use, and after the black liquor has been thus treated and returned one or more times, treating the resulting black liquor for the separation of precipitable organic matter therefrom and removing volatile organic acids therefrom.

15. The method of treating black liquor which comprises removing precipitable organic matter therefrom by means of an acid alkali metal salt having an acid radical capable of forming causticizible sodium salts, and causticizing the resulting liquor, concentrating the resulting caustic solution, returning the concentrated and causticized liquor to the digester for further use, and after the black liquor has been thus treated and returned one or more times, treating the resulting black liquor for the separation of precipitable organic matter therefrom and removing volatile organic acids therefrom.

16. The method of treating black liquor which comprises removing precipitable organic matter therefrom by means of an acid sodium salt having an acid radical capable of forming causticizable sodium salts, and causticizing the resulting liquor, concentrating the resulting caustic solution, returning the concentrated and causticized liquor to the digester for further use, and after the black liquor has been thus treated and returned one or more times, treating the resulting black liquor for the separation of precipitable organic matter therefrom and removing volatile organic acids therefrom.

17. The method of treating the black liquor which comprises removing precipitable organic matter therefrom by means of an acid compound having an acid radical capable of forming causticizible sodium salts, and causticizing the resulting liquor, concentrating the resulting caustic solution, returning the concentrated and causticized liquor to the digester for further use, and after the black liquor has been thus treated and returned one or more times, treating the resulting black liquor for the separation of precipitable organic matter therefrom and volatilizing volatile organic acids.

18. The method of treating black liquor which comprises removing precipitable organic matter therefrom by means of an acid salt alkali metal salt having an acid radical capable of forming causticizible sodium salts, and causticizing the resulting liquor, concentrating the resulting caustic solution, returning the concentrated and causticized liquor to the digester for further use, and after the black liquor has been thus treated and returned one or more times, treating the resulting black liquor for the separation of precipitable organic matter therefrom and volatilizing volatile organic acids.

19. The method of treating black liquor which comprises removing precipitable organic matter therefrom by means of an acid sodium salt having an acid radical capable of forming causticizible sodium salts, and causticizing the resulting liquor, concentrating the resulting caustic solution, returning the concentrated and causticized liquor to the digester for further use, and after the black liquor has been thus treated and returned one or more times, treating the resulting black liquor for the separation of precipitable organic matter therefrom and volatilizing volatile organic acids therefrom.

20. The method of treating the black liquor which comprises removing precipitable organic matter therefrom by means of an acid salt having an acid radical capable of forming causticizible sodium salts, and causticizing the resulting liquor, concentrating the resulting caustic solution, returning the concentrated and causticized liquor to the digester for further use, and after the black liquor has been thus treated and returned one or more times, treating the resulting black liquor for the separation of precipitable organic matter therefrom and volatilizing acetic acid.

21. The method of treating black liquor which comprises removing precipitable organic matter therefrom by means of an acid alkali metal salt having an acid radical capable of forming causticizible sodium salts, and causticizing the resulting liquor, concentrating the resulting caustic solution, returning the concentrated and causticized liquor to the digester for further use, and after the black liquor has been thus treated and returned one or more times, treating the resulting black liquor for use for the separation of precipitable organic matter therefrom and volatilizing acetic acid.

22. The method of treating residual liquor from the cooking of fibrous materials with alkali metal compounds which comprises removing organic matter by precipitation therefrom, treating the resulting solution to produce a regenerated cooking liquor containing alkali metal compounds, subjecting the precipitate to a destructive distillation whereby available volatile compounds are recovered and a charcoal residue produced, and utilizing the charcoal residue for filtering the regenerated cooking liquor.

23. The method of producing sodium acetate which comprises cooking wood in a solution containing sodium ion, removing organic matter from the solution by precipitation with a suitable acid radical, subjecting such organic matter to destructive distillation whereby volatile by-products are recovered and a charcoal residue is obtained, utilizing such charcoal for filtering the solution of sodium compounds and recovering sodium acetate from the clarified solution by crystallization.

24. The method of producing acetate-bearing material which comprises cooking cellulose-bearing material in a non-acid cooking liquor, recovering a material including acetate-bearing material from the residual liquor resulting from the cooking step, including recovered acetate-bearing material in a cooking liquor used for cooking another lot of cellulose-bearing material thereby increasing the amount of acetate-bearing material, and thereafter separating acetate-bearing material from other material contained in the residual cooking liquor.

25. The method of producing acetate-bearing material which comprises cooking cellulose-bearing material in a cooking liquor, separating acetate-bearing material from other carbon-containing material, including such acetate-bearing material in a cooking liquor used for cooking another lot of cellulose-bearing material, thereby increasing the amount of acetate-bearing material.

In testimony whereof we affix our signatures.

LINN BRADLEY.
EDWARD P. McKEEFE.